(12) United States Patent
Kikuchi et al.

(10) Patent No.: US 10,116,856 B2
(45) Date of Patent: Oct. 30, 2018

(54) IMAGING APPARATUS AND IMAGING METHOD FOR CONTROLLING A DISPLAY WHILE CONTINUOUSLY ADJUSTING FOCUS OF A FOCUS LENS

(71) Applicant: OLYMPUS CORPORATION, Hachioji-shi, Tokyo (JP)

(72) Inventors: Tetsuo Kikuchi, Hachioji (JP); Satoru Ito, Fuchu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/407,134

(22) Filed: Jan. 16, 2017

(65) Prior Publication Data
US 2017/0214844 A1   Jul. 27, 2017

(30) Foreign Application Priority Data

Jan. 23, 2016  (JP) ................. 2016-011156

(51) Int. Cl.
| | |
|---|---|
| *G03B 13/00* | (2006.01) |
| *H04N 5/232* | (2006.01) |
| *G03B 13/36* | (2006.01) |
| *H04N 5/222* | (2006.01) |
| *H04N 5/235* | (2006.01) |

(52) U.S. Cl.
CPC ......... *H04N 5/23212* (2013.01); *G03B 13/36* (2013.01); *H04N 5/2351* (2013.01); *H04N 5/23293* (2013.01); *G06T 2207/10148* (2013.01); *H04N 5/2356* (2013.01)

(58) Field of Classification Search
CPC ............. H04N 5/23212; H04N 5/2356; H04N 5/2351; G03B 13/36; G06T 2207/10148
USPC ..................... 348/345–349, 333.01
See application file for complete search history.

(56) References Cited

U.S. PATENT DOCUMENTS

| | | | | | |
|---|---|---|---|---|---|
| 7,620,304 | B2* | 11/2009 | Larner | ..................... | G03B 7/00 |
| | | | | | 348/352 |
| 8,106,995 | B2* | 1/2012 | Tamaru | ..................... | G02B 7/38 |
| | | | | | 348/345 |
| 8,208,732 | B2* | 6/2012 | Nakamura | ......... | G06K 9/00281 |
| | | | | | 382/118 |
| 8,456,567 | B2* | 6/2013 | Endoh | ..................... | G02B 7/36 |
| | | | | | 348/345 |
| 8,614,752 | B2* | 12/2013 | Ejima | ................. | H04N 5/23216 |
| | | | | | 348/222.1 |
| 9,083,878 | B2* | 7/2015 | Kikuchi | ............. | H04N 5/23212 |
| 9,818,202 | B2* | 11/2017 | Masuda | .................. | G06T 7/246 |
| 2005/0007486 | A1* | 1/2005 | Fujii | .................. | H04N 5/23212 |
| | | | | | 348/345 |

(Continued)

*Primary Examiner* — Ngoc-Yen Vu
(74) *Attorney, Agent, or Firm* — John C. Pokotylo; Pokotylo Patent Services (57) ABSTRACT

An imaging apparatus, comprising a focus controller that generates an evaluation value by extracting given signal components from an image signal, and carries out focus adjustment by calculating position of the focus lens where the evaluation value becomes a peak, a display that displays an image based on image data generated from the image signal, and a controller that, as initial image display after commencement of the continuous focus adjustment operation, executes display using the display based on image data corresponding to an image signal in which the evaluation value becomes a peak, from among image data that has been acquired during the focus adjustment operation.

8 Claims, 4 Drawing Sheets

(56) References Cited

U.S. PATENT DOCUMENTS

2005/0275742 A1\* 12/2005 Baron ................ H04N 5/23212
348/345
2012/0057034 A1 3/2012 Tanaka
2013/0021514 A1 1/2013 Kamimura
2016/0330366 A1\* 11/2016 Kinoshita .......... H04N 5/23212

\* cited by examiner

IMAGING APPARATUS AND IMAGING METHOD FOR CONTROLLING A DISPLAY WHILE CONTINUOUSLY ADJUSTING FOCUS OF A FOCUS LENS

Benefit is claimed, under 35 U.S.C. § 119, to the filing date of prior Japanese Patent Application No. 2016-011156 filed on Jan. 23, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and imaging method capable of so-called continuous AF (Auto Focus), whereby focus adjustment to move a focus lens based on imaging signals of an image sensor that forms an image of a subject is carried out repeatedly.

2. Description of the Related Art

Conventionally, contrast AF, in which an evaluation value (also called contrast value) is calculated based on image signals from an image sensor while moving the focus lens (called "scan operation"), and focus adjustment is carried out to a position of a focus lens where this evaluation value becomes a peak, has been used in an imaging apparatus. Also, in contrast AF there is single AF where focus adjustment is carried out once in response to half pressing of a release button etc., and continuous AF (hereafter referred to as "C-AF") where the single AF is executed repeatedly.

Since contrast AF is executed each time readout of an image signal is carried out from the image sensor, improvement in AF speed is achieved by making a frame rate high-speed (refer, for example, to Japanese patent laid open number 2013-025107 (hereafter referred to as patent publication 1), and Japanese patent laid open number 2012-060371 (hereafter referred to as patent publication 2)). Also, for display when carrying out burst capture (repeatedly shooting continuously) together with carrying out focus adjustment using C-AF, Quickview Display that is carried out based on image data that has been acquired using burst capture (called Quickview burst capture), or live view display that is carried out based on image data read out from the image sensor at a frame rate, are performed.

SUMMARY OF THE INVENTION

An imaging apparatus of a first embodiment of the present invention, for carrying out focus adjustment by moving a focus lens based on an image signal of an image sensor for forming a subject image, comprises a focus controller that generates an evaluation value by extracting given signal components from the image signal, and carries out focus adjustment by calculating position of the focus lens where the evaluation value becomes a peak, a display that displays an image based on image data generated from the image signal of the image sensor, and a controller that executes to display an image using the display by generating image data based on an image signal that has been acquired during a focus adjustment operation where continuous focus adjustment is executed by the focus controller, wherein the controller, as initial image display after commencement of the continuous focus adjustment operation, executes display using the display based on image data corresponding to an image signal in which the evaluation value becomes a peak, from among image data that has been acquired during the focus adjustment operation.

An imaging apparatus of a second embodiment of the present invention, for carrying out a focus adjustment operation by moving a focus lens based on an image signal of an image sensor for forming a subject image, comprises a focus controller that generates an evaluation value by extracting given signal components from the image signal, and carries out focus adjustment by calculating position of the focus lens where the evaluation value becomes a peak, a tracking circuit that carries out a tracking operation based on image data generated from an image signal of the image sensor, and a controller that causes execution of a tracking operation by the tracking circuit by generating image data based on an image signal that has been acquired during a focus adjustment operation where continuous focus adjustment is executed by the focus controller, wherein the controller causes execution of a tracking operation by the tracking circuit using image data corresponding to an image signal in which the evaluation value becomes a peak, from among image data that has been acquired during the focus adjustment operation.

An imaging method of a third embodiment of the present invention, for carrying out focus adjustment by moving a focus lens based on an image signal of an image sensor for forming a subject image, comprises generating an evaluation value by extracting given signal components from the image signal, and carrying out focus adjustment by calculating position of the focus lens where the evaluation value becomes a peak, and displaying an image using a display by generating image data based on an image signal that has been acquired during a focus adjustment operation where continuous focus adjustment is executed, wherein when displaying the image on the display, as initial image display after commencement of the continuous focus adjustment operation, display is executed using the display based on image data corresponding to an image signal in which the evaluation value becomes a peak, from among image data that has been acquired during the focus adjustment operation.

DETAILED DESCRIPTION OF THE PREFERRED EMBODIMENTS

Preferred embodiments using a camera to which the present invention has been applied will be described in the following in accordance with the drawings. One preferred embodiment of the present invention is an example applied to a digital camera as an imaging apparatus. This camera has an image sensor, and focus adjustment is carried out by moving a focus lens based on an image signal (also referred to as "image data") of the image sensor that forms a subject image. Also, a subject image is subjected to live view display on a display that is arranged on a rear surface of a camera body, based on a converted image signal (image data). A photographer determines composition and photo opportunity by looking at the live view display.

Also, if continuous AF is set, a scan operation of the photographing lens is invoked, an evaluation value (contrast value) based on an image signal (image data) from the image sensor at this time is acquired, and a history of times when an in-focus position is reached and the in-focus positions of the focus lens, where this contrast value become a peak, is stored. At the time of release operation, and at the time of subsequent continuous shooting, in-focus position at the time of actual exposure is predicted taking into consideration time lag, based on the focus history. If image data is acquired by actual exposure, this image data is subjected to image processing and stored in a storage medium. Image data that has been stored in the storage medium can be subjected to playback display on the display section if playback mode is selected.

Also, if continuous shooting mode has been set, actual exposure is executed at given time intervals, and image data is acquired and stored in a storage medium. Between each of the actual exposures, a scan operation is executed, and actual exposure is executed at a focus lens position where the evaluation value becomes a peak. During a scan operation, if image data for a single frame is acquired when the focus lens passes through the vicinity of a focus prediction position, display is performed on the display based on image data at this time. Display is not carried out for frames other than this frame, and a single color image such as a black image is displayed on the display.

Figure 1:
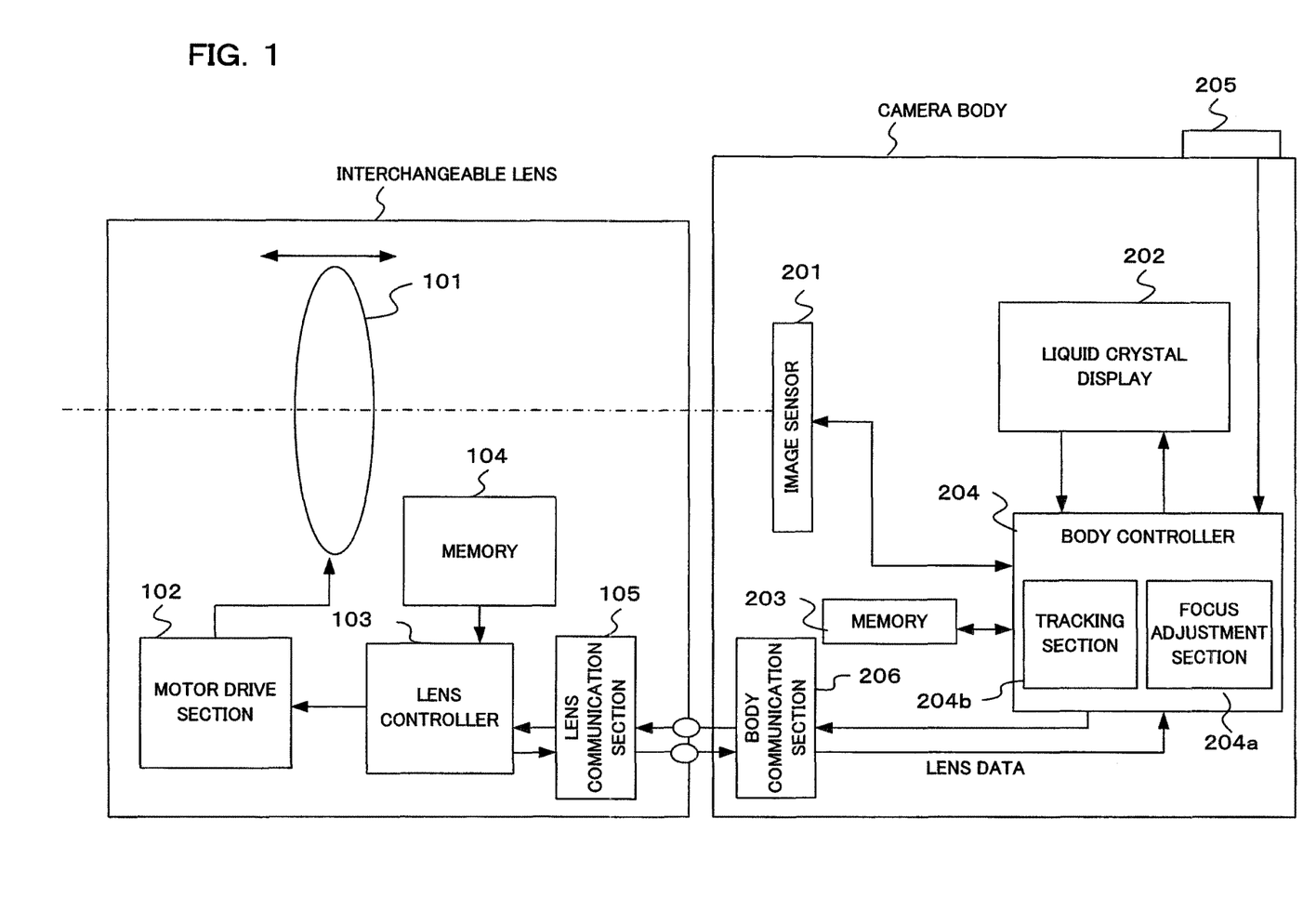
FIG. 1 is a block diagram mainly showing the electrical structure of a camera of one embodiment of the present invention.

FIG. 1 is a block diagram mainly showing the electrical structure of a camera of one embodiment of the present invention. The camera of this embodiment comprises a camera body 200 having an image sensor, and an interchangeable lens 100 that is removably attached to this camera body 200. With this embodiment, an interchangeable lens is exemplified, but it is also possible to fix a lens barrel to the camera body.

A photographing lens 101, motor drive section 102, lens control section 103, memory 104 and a lens communication section 105 are provided within the interchangeable lens 100. The photographing lens 101 includes optical lenses such as a focus lens and a zoom lens, and forms a subject image using a photographing optical system constructed using these optical lenses. The motor drive section 102 has a drive source such as a motor, and a motor drive circuit etc., and causes the focus lens to move along the optical axis direction of the photographing optical system.

The lens control section 103 is constituted by a lens CPU and its peripheral circuits. The lens CPU carries out control of each section within the interchangeable lens 100 in accordance with programs stored in the memory 104 and control instructions from a body CPU within the body controller 204 at the camera body 200 side. The lens control section 103, for example, carries out control such as controlling movement of the focus lens of the photographing lens 101 via the motor drive section 102 in accordance with instructions from the body controller 204, and control of a scan operation of the focus lens and drive to a focus position etc. Also, lens state, such as current position of the focus lens or zoom lens, scan operation in progress etc., and information inherent to the lens etc. is transmitted as lens data to the camera body 200 side by means of the lens communication section 105.

The lens communication section 105 has a communication circuit, and carries out communication with the camera body 200. Specifically, if the interchangeable lens 100 is attached to the camera body 200, connection is made with the body communication section 206 of the camera body 200 and communication between the lens control section 103 and the body controller 204 becomes possible.

Within the camera body 200 there are an image sensor 201, a liquid crystal display 202, memory 203, body controller 204, operating section 205, and body communication section 206. An image sensor 201 is arranged on the optical axis of the photographing lens 101 close to an imaging position of a subject image, and outputs image data (also called an image signal) obtained by photo-optically converting a subject image using a plurality of pixels arranged in a two dimensional array to the body control section 204.

The body controller 204 is constituted by a body CPU and its peripheral circuits. The body CPU carries out overall control of the camera in accordance with programs stored in the memory 203. Various circuits such as an image processing section, compression and expansion section and communication section etc. are provided as peripheral circuits within the body controller 204, in order to carry out processing of image data and the like in cooperation with the body CPU. There are also a focus controller 204a and a tracking section 204b as peripheral circuits.

The focus controller 204a has an evaluation value calculation circuit, and acquires an evaluation value (contrast value) for a subject image by being input with image data from the image sensor 201 and acquiring a difference signal between adjacent pixels. Also, this focus controller 204a carries out focus adjustment, in cooperation with the body CPU, to move the focus position of the focus lens to an in-focus position by means of the lens control section 103 and the motor drive section 102. This focus controller 204a functions as a focus controller that generates an evaluation value by extracting given signal components from the image signal, and carries out focus adjustment by calculating position of the focus lens where the evaluation value becomes a peak.

The tracking section 204b has a tracking circuit, and tracks position of the same subject by comparing image data of a plurality of frames that have been output from the image sensor 201. For example, it is possible to track the same person who has been detected by a face detection section or the like. The user may also set a subject that they wish to track by a manual operation. The tracking circuit in the tracking section 204b functions as a tracking circuit for carrying out a tracking operation based on image data that has been generated from an image signal of the image sensor.

The body controller 204 functions as a controller that displays an image using the display by generating image data based on an image signal that has been acquired during a focus adjustment operation where continuous focus adjustment is executed by the focus controller. This controller executes display of image data corresponding to an image signal for which an evaluation value has been made a peak by the focus controller, among image data that has been acquired during a focus adjustment operation, as initial display after commencement of a continuous focus adjustment operation, on the display (refer, for example, to time t5-t6 in FIG. 2 and FIG. 3).

Figure 2:
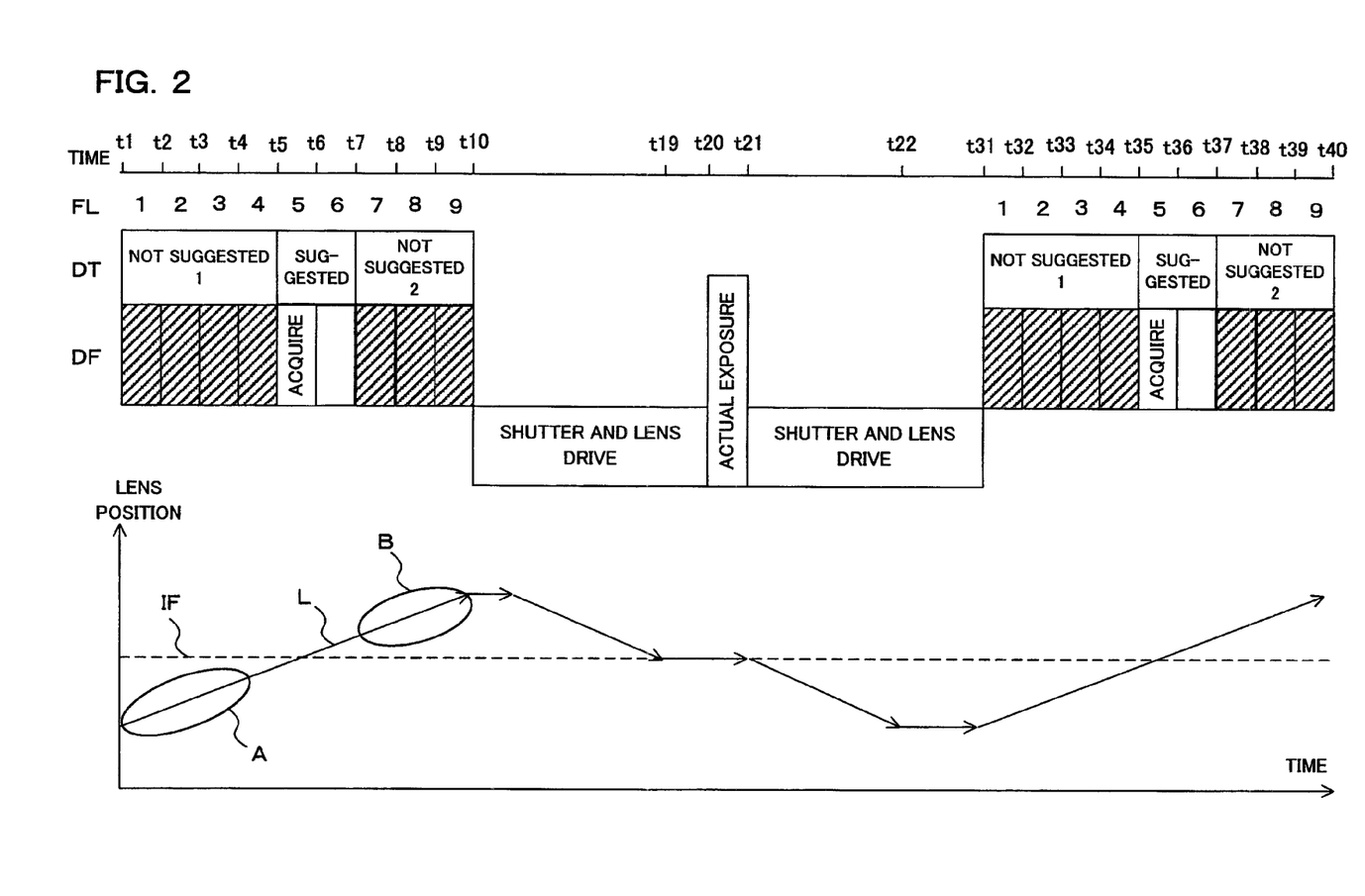
FIG. 2 is a drawing showing a sequence during burst shooting in a case where release priority has been set, in one embodiment of the present invention.
Figure 3:
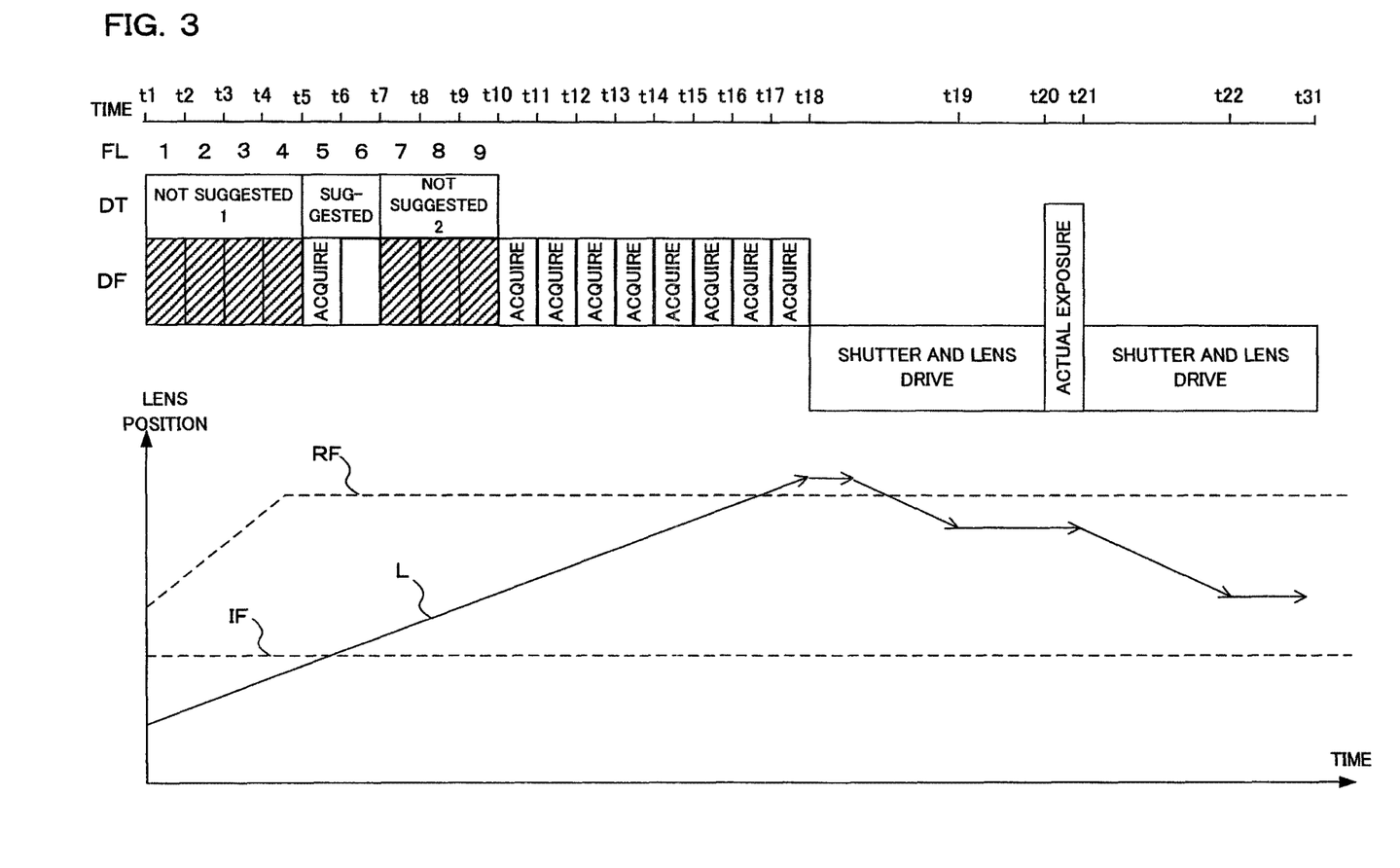
FIG. 3 is a drawing showing a sequence during burst shooting in a case where release priority is unset, in one embodiment of the present invention.

Also, after having executed the initial display using the display, the controller does not execute to display for a given period (refer, for example, to time t7-t10 in FIG. 2 and FIG. 3). Image data corresponding to an image signal in which the evaluation value has become a peak is a predicted in-focus frame (refer, for example, to time t5-t6 in FIG. 2 and FIG. 3, and predicted in-focus position IF in the graphs).

Also, the body controller 204 functions as a controller that generates image data based on an image signal that has been acquired during a focus adjustment operation, where a focus adjustment operation is executed continuously using a focus controller, and executes a tracking operation using a tracking circuit. This controller causes execution of a tracking operation by the tracking circuit using image data corresponding to an image signal in which the evaluation value becomes a peak by the focus controller, from among image data that has been acquired during the focus adjustment operation.

The memory 203 within the camera body 200 has various memory such as volatile rewritable memory such as RAM, non-volatile rewritable memory such as flash memory, and removable storage media etc. Besides programs for the body CPU, which were described previously, various data for adjustment are stored in the nonvolatile memory. Image data for taken images that have been subjected to image processing by the body controller 204 are stored in a storage medium. Also the memory 203 detects a time for executing a scan operation to detect a focus lens position at which contrast of an image becomes a peak, and stores this time. The function of storing focus history may also be fulfilled by a temporary storage section (not shown) incorporated into the body controller 204.

A liquid crystal display 202 has a liquid crystal monitor that is arranged on a rear surface or the like of the camera body 200. Live view display based on image data from the image sensor 201, playback display based on taken image data that has been read out from the memory 203, and display of menu images etc. for setting various shooting modes, are carried out on the liquid crystal display 202. In a case where C-AF and continuous shooting mode have been set, then as has been described above, an image that is based on image data that has been acquired in the vicinity of an in-focus position is displayed. The monitor is not limited to a liquid crystal monitor, and another monitor such as organic EL may also be used, and may be arranged on other than the rear surface of the camera body 200. The liquid crystal display 202 functions as a display for displaying an image based on image data that has been generated from an image signal of the image sensor.

The operating section 205 includes various operating members such as a release button, power supply button, menu button, OK button, and a cross shaped button, and operating states of these operating members are output to the body controller 204. The body controller 204 executes camera control in accordance with operation signals from the operating section 205. Various settings, such as various mode settings like continuous shooting mode and continuous AF mode, setting of continuous shooting speed (number of shot frames at the time of continuous shooting) when continuous shooting mode is set, release priority mode etc. are carried out on menu screens etc. In the case where the above-described release priority mode is on, priority is given to continuous shooting using the continuous shooting speed even if focus has not been achieved (refer to FIG. 2, which will be described later), while if the release priority mode is off, shooting (actual exposure) is not executed if a focused state has not been achieved (refer to FIG. 3, which will be described later).

The body communication section 206 has a communication circuit, and carries out communication with the interchangeable lens 100. Specifically, if the interchangeable lens 100 is attached to the camera body 200, the body communication section 206 establishes connection with the lens communication section 105 within the interchangeable lens 100 and communication between the lens control section 103 and the body controller 204 becomes possible.

Next, a display operation for a subject image in a case where C-AF and continuous shooting mode of this embodiment have been set (continuous shooting C-AF) will be described using FIG. 2 and FIG. 3.

FIG. 2 shows a sequence during continuous shooting in a case where the release priority mode has been set to on. The horizontal axis in the graph shown in FIG. 2 represents change in time, while the vertical axis represents the position of a focus lens, with a dashed line representing predicted in-focus position IF and a solid line representing movement position L of the focus lens. The headings in the upper part of FIG. 2 show, from the top, times (t1-t39), frame number FL, display suggested image period DT, and display frame DF.

FIG. 2 shows a sequence during continuous shooting, and actual exposure (actual shooting) is already being executed before time t1. After completion of the previous actual exposure, the period from time t1-t10 is a scan operation period, in which the focus lens is moved from the initial position for the purpose of the scan operation. During this operation exposure is performed at given intervals determined based on frame rate, and image data for a single frame is read out from the image sensor 201 once an exposure time has elapsed.

In FIG. 2, if image data corresponding to frame No. 1 is read-out, an evaluation value for contrast AF is calculated. However, since at this point in time a subject was not in-focus in this frame, display of a subject image on the liquid crystal display 202 is not carried out, and only a single color image, such as a simple black image, is displayed. After that, similarly, calculation of evaluation values and display of single color images is also carried out for frame Nos. 2-4 (from time t2 to t4). It should be noted that hatched frames shown in the display frame DF section in FIG. 2 represent read-out image data that is used in evaluation value calculation but is not used in display.

In FIG. 2, image data that has been read out corresponding to frame No. 5 (time t5-t6) is image data that has been formed in the vicinity of a predicted in-focus position. The predicted in-focus position is a position that has been predicted to be an in-focus position this time based on focus history, specifically a history of times when in-focus position has been reached and in-focus position of the focus lens. If the subject is not moving in a distance direction, then in-focus position becomes the same as the previous in-focus position. An image that has been exposed at the predicted in-focus position has a high possibility of being in focus, and is therefore acquired as image data for display on the liquid crystal display 202 (referred to display frame DF in FIG. 2).

In the event that image data was not incorporated in frame No. 5, image data is acquired in frame No. 6 (time t6-t7) and an image is displayed on the liquid crystal display 202. It should be noted that "acquired" frames shown in the display frame DF section in FIG. 2 represent read-out image data that is used in evaluation value calculation and is also used in display.

Next, in frame No. 7 (time t7-t8) image data corresponding to this frame number is read out, and an evaluation for contrast AF is calculated in order to carry out detection of an evaluation value peak. Since, at this point in time, the lens is not at a predicted in-focus position, display of a subject image on the liquid crystal display 202 is not carried out, and only a single color image, such as a simple black image, is displayed. Subsequently, for frame Nos. 8 and 9 also (time t8-t10), similarly, calculation of evaluation value for peak detection and display of a singe color image are carried out.

If image data has been acquired for frame Nos. 1-9, it is possible to detect a peak of evaluation value joined this time, and on the basis of this it is possible to obtain an in-focus position of the focus lens for this time. Then, in the period from time t10-t20 the shutter is closed, and lens drive to the in-focus position is carried out. Specifically, a mechanical shutter (not illustrated) is closed, and the in-focus position is calculated. If an in-focus position has been calculated, the body controller 204 (focus controller 204*a*) causes the focus lens to be moved to the in-focus position by means of the lens control section 103 and the motor drive section 102 (arriving at the in-focus position at t19).

Once the focus lens has arrived at the in-focus position, the mechanical shutter is opened and actual exposure is commenced (time t20). Exposure time for the actual exposure is determined using shutter speed that has been set automatically or manually. Once the exposure time has elapsed (at time t21), the mechanical shutter is closed and image data is read out from the image sensor 201. If read-out times for image data of each frame during the scan operation (time t1-t10) are compared, a high number of pixels are read out, and so read out time is long.

Also, in order to carry out the scan operation the body controller 204 (focus controller 204*a*) causes movement of the focus lens to the initial position by means of the lens control section 103 and the motor drive section 102 (arriving at the initial position at time t22).

Once time t31 is reached, where the focus lens has arrived at the initial position, then shooting is repeated, in the same way as that previously described for time t1. Specifically, the scan operation (time t31-t40) is carried out, and once the scan operation is complete shutter drive and lens drive are carried out to carry out actual exposure.

In this way, with this embodiment, in a scan operation during continuous shooting, image display is carried out based on image data that has been acquired in the vicinity of a predicted in-focus position for the focus lens, and image display is not carried out based on image data that has been acquired after that.

Therefore, with this embodiment, a through image display period for during the scan operation (time t1-t10) is divided into three periods, namely a display not suggested period 1, a display suggested period, and a display not suggested period 2, and processing of image data that has been read out from the image sensor 201 is made different for the respective periods.

The display not suggested period 1 (time t1-t5) is a period from commencement of the scan operation until before an in-focus frame (frame No. 4). In this period, read out of image data from the image sensor 201 is carried out, but while this image data is used in calculation of evaluation value for contrast AF, it is not used in through image display in the liquid crystal display 202. It should be noted that image data read out from the image sensor 201 is subjected to thinning processing for use in evaluation value calculation, during the scan operation.

This display not suggested period 1 corresponds to region A in FIG. 2, and in this period there is a state of significant boke even if a subject image is displayed. If a subject image with significant boke is displayed the user may be disconcerted, and so a through image is not displayed on the liquid crystal display 202, and the single color image such as a simple black image is displayed.

The display suggested period (t5-t7) is a period of in-focus frames. In this period the focus lens is in the vicinity of a predicted in-focus position, and read out of image data from the image sensor 201 is performed. This image data that has been read out is used in calculation of evaluation value for contrast AF, and is also used in through image display on the liquid crystal display 202. As was described previously, the predicted in-focus position is a position that has been predicted to be an in-focus position this time based on focus history, specifically a history of times when in-focus position has been reached and in-focus position of the focus lens. Therefore, images used for display that have been acquired in the display suggested period are images that have a high possibility of being in focus, and that are suitable for the user to monitor the subject image.

The display not suggested period 2 (t7-t10) is a period after an in-focus frame, and before a period of shutter drive and lens drive. In this period, similarly to the not suggested period 1, read out of image data from the image sensor 201 is carried out, but while this image data is used in calculation of evaluation value for contrast AF, it is not used in through image display on the liquid crystal display 202. This display not suggested period 2 corresponds to region B in FIG. 2, and in this period there is a state of significant boke even if a subject image is displayed. If a subject image with significant boke is displayed the user may be disconcerted, and so a through image is not displayed on the liquid crystal display 202, and only a single color image such as a simple black image is displayed, or keep display of an image that was incorporated in the display suggested period continues. It should be noted that in a case where it is not possible to acquire image data for display in the suggested period, incorporation is made permissible.

Next, a continuous shooting sequence for a case where the release priority mode has been set to off will be described using FIG. 3. The horizontal axis in the graph shown in FIG. 3 represents change in time, while the vertical axis represents position of the focus lens, with dashed lines representing predicted in-focus position IF and real in-focus position RF, and a solid line representing movement position L of the focus lens. The headings in the upper part of FIG. 2 show, from the top, times (t1-t31), frame number FL, display suggested image period DT, and display frame DF.

In the event that release priority mode has been turned off also, until time t10 subject image display is performed in the same way as in the case where the release priority mode is turned on. Specifically, through image display is carried out based on image data that has been acquired in a case where the focus lens is at a predicted in-focus position, and through image display is not carried out based on image data that has been acquired at other positions. However, while image data that has been acquired in frame No. 5 (time t5-t6) is at a predicted in-focus position, it is not at a real in-focus position, and so an image for through image display is blurred.

The case where release priority mode is turned on and the case where release proxy mode is turned on differ in terms of the processing for time t10-t18. Specifically, in the case where release priority mode is off it is a focus priority mode, and so until a focused state is achieved image data is repeatedly read out from the image sensor 201, calculation of evaluation value is carried out, and detection of an evaluation value peak continues.

With the example shown in FIG. 3, a real in-focus position RF is offset from a predicted in-focus position IF, which means that an evaluation value will not become a peak in the vicinity of time t5. Therefore, in the period from time t10-t18 image data is read out from the image sensor 201 at given intervals in accordance with frame rate, and calculation of evaluation value continues. Also, at the same time, through image display is also carried out based on image data that has been read out. As was described previously, an image that is acquired at a predicted in-focus position and displayed is blurred, and so from time t10 onwards through image display is carried out every time image data is acquired. Specifically, through image display is performed for all image data.

With the example shown in FIG. 3, since evaluation value based on image data that has been acquired in the vicinity of time t16-t17 reaches a peak, an image for through image based on image data incorporated at this point in time becomes in focus. At time t18, the fact that the evaluation value has passed its peak is detected, and so the scan operation is stopped and shutter and lens drive are carried out. After this time t18 the situation is the same as for the case in FIG. 2, and so detailed description is omitted.

The example shown in FIG. 3 is a case where the subject has moved suddenly, and in-focus position changes as illustrated (refer to real in-focus position RF). For this type of subject, to obtain an image that is in focus the release priority mode should be turned off, an in focus state awaited, and then shooting carried out. Also, with this embodiment, after the display not suggested period 2 (time t7-t10), shutter drive and lens drive are not commenced and calculation of evaluation value for peak detection continues, and during this time through image display is carried out based on image data that has been read out from the image sensor 201. As a result, it becomes possible to confirm an in focus subject image at any time.

It should be noted that in FIG. 2 and FIG. 3, in obtaining in-focus position a subject is tracked, and a position where this tracked subject reaches a focused state may be made an in-focus position. Specifically, a tracking target is set based on image data, and if image data for the vicinity of a predicted in-focus position is output the tracking target is tracked by the tracking section 204b. An in-focus position may then be obtained using image data for part of this tracking target. Since tracking is carried out using image data for the vicinity of a predicted in-focus position, image data in a significant boke state is not used which means that it is possible to improve tracking performance. It should be noted that the tracking target may be determined using face detection, or may be set by the user using a manual operation. Also, the term "tracking" here refers to detection of movement in XY directions within a plane using movement vectors.

Next, continuous AF operation of this embodiment will be described using the flowchart shown in FIG. 4. If the release button is pressed down fully when continuous shooting mode is set, the processing flow for continuous AF shown in FIG. 3 is commenced.

If the flow for continuous AF is entered, first initial position drive is executed (S11). Scan control of step S15, which will be described later, is carried out, but at the time of commencing this scan control the focus lens position is driven to an optimum position (lens position corresponding to times t1 and t31 in FIG. 2 and FIG. 3). Specifically, in contrast AF evaluation value peak is detected, but at the time of actual exposure (S21 which will be described later) the focus lens is moved to a position corresponding to an evaluation value peak. Scan for contrast AF preferably starts from a position slightly offset from an evaluation value peak position. In this step, therefore, drive is performed so that a position that is slightly offset from the peak position of evaluation value becomes the initial position, taking into consideration the drive direction of the focus lens up to that time.

If initial position drive has been carried out in step S11, exposure conditions for scan are next determined (S13). Here, exposure conditions at the time of scan control carried out in step S15 are determined. In determining exposure conditions, image data for when actual exposure was carried out the previous time, or image data for a live view image, is incorporated, brightness information is calculated from this image data, and exposure conditions during scan (for example electronic shutter speed etc.) are determined.

If determination of exposure conditions has been carried out in step S13, scan control is next carried out (S15). With continuous AF, actual exposure and scan control are repeated while the release button is pressed down fully, and with the scan control scan drive is carried out for a given number of frames (9 frames in the example shown in FIG. 2) in accordance with continuous shooting speed at the time of continuous shooting mode setting. In this step S15, evaluation value is calculated every time image data is acquired from the image sensor 201 while moving the focus lens Also, as was described using FIG. 2 and FIG. 3 in the display suggested period (time t5-t7), through image display of the subject image is carried out based on image data that was acquired when the focus lens was at the predicted in-focus position. Regarding the predicted in-focus position, for a subject that has been made a tracking target by the tracking section 204b, previous in-focus positions at the time of actual exposure may be stored as a focus history, and the in-focus predicted position may be determined based on this focus history. In the event that there is no tracking, in-focus position for the previous time may be substituted.

If the scan control of step S15 is completed, next calculation of in-focus position is carried out (S17). This calculation of in-focus position is carried out before commencement of drive of the focus lens, which in the example shown in FIG. 2 is after time t10. In this step S17, in-focus position during actual exposure is predicted using a focus history up to now and peak position of evaluation value that has been detected during the scan operation of step S15, taking into consideration the continuous shooting interval until the actual exposure of step S21, which will be described later. It should be noted that the mechanical shutter is temporarily closed.

If calculation of in-focus position has been carried out in step S17, next focus drive is executed (S19). Here, the body controller 204 drives the focus lens towards the in-focus position that was calculated in step S17, by means of the lens control section 103 and the motor drive section 102. This focus lens drive is carried out in the period t10-t19 in FIG. 2.

If the focus drive of step S19 has been executed, actual exposure is next carried out (S21). Here, exposure control is carried out at an aperture value and shutter speed etc. for achieving appropriate exposure, image processing is carried out on image data that has been acquired by the image sensor 201 at this time, and image data that has been subjected to this image processing is stored in the memory 203. It should be noted that with this actual exposure, the mechanical shutter is opened, and once actual exposure is complete the mechanical shutter is closed. This closed mechanical shutter is opened until the next scan control.

If actual exposure has been executed in step S21, it is next determined whether or not 2R is kept held (S23). As described previously, in continuous shooting mode continuous shooting continues while the release button is pressed down fully. In this step, it is determined whether or not the 2nd release (2R) switch, that is linked to full pressing down of the release button, remains on.

If the result of determination in step S23 is that 2R is maintained, processing returns to step S11, where there is drive to the initial position, in-focus position is predicted and actual exposure is carried out, and continuous shooting continues. On the other hand, if maintaining of 2R does not continue, namely if the user's finger has been taken off the release button, the processing flow for continuous AF is terminated.

Figure 4:
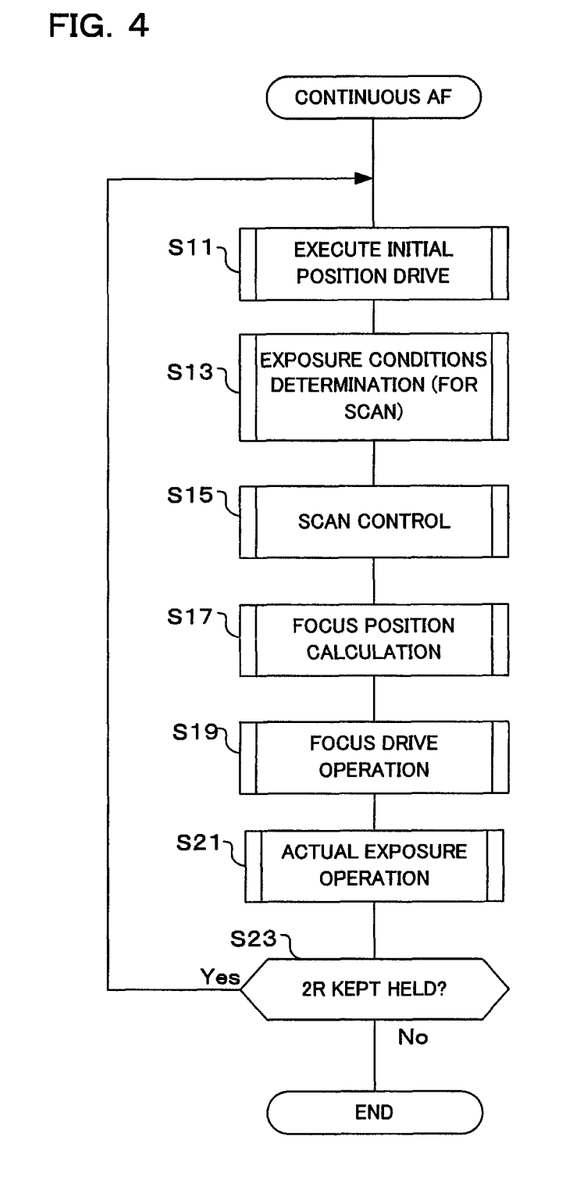
FIG. 4 is a flowchart showing continuous AF operation of the camera of one embodiment of the present invention.

In this way, with the one embodiment of the present invention, given signal components are extracted from an image signal to generate an evaluation value, and focus adjustment is carried out by calculating a position of the focus lens where this evaluation value becomes a peak (refer, for example, to the focus controller 204 in FIG. 1, and S11-S19 in FIG. 4). Also, there is a display (for example, the liquid crystal display 202 in FIG. 1) that displays an image based on image data that has been generated from an image signal of the image sensor, and an image is displayed using the display by executing a focus adjustment operation continuously and generating image data based on an image signal that has been acquired during the focus adjustment operation. At the time of this display, display is executed using the display by performing initial image display, after commencement of a continuous focus adjustment operation, based on image data corresponding to an image signal in which an evaluation value becomes a peak, among image data that has been acquired during a focus adjustment operation (refer, for example, to the controller 204 in FIG. 1, the suggested display period of time t5-t6 in FIG. 2 and FIG. 3, and S15 in FIG. 4). In this way, when continuous shooting is carried out using C-AF also, it is possible to optimally display a subject image, and it is possible for the user to carry out accurate framing. In particular, it is possible to prevent display of a through image that has significant boke after commencement of the scan operation.

Also, with the one embodiment of the present invention, after carrying out initial image display based on image data corresponding to an image signal in which the evaluation value becomes a peak, display is not carried out for a given period (for example, the period of t7-t10 in FIG. 2). In this way it is possible to prevent display of a through image having significant boke after carrying out initial image display.

Also, with the one embodiment of the present invention, image data corresponding to an image signal in which the evaluation value becomes a peak is an in-focus predicted frame (refer, for example, to the predicted in-focus position IF and suggested display period of time t5-t6 in FIG. 2). In this way, when carrying out initial image display it is possible to display an image in an in-focus state.

Also, with the one embodiment of the present invention, in a case where it is not possible to detect an evaluation value peak even if given scan drive is carried out (refer, for example, to frame Nos. 1-9 for time t1-t10 in FIG. 3), scan drive continues and an evaluation value is detected, and image display is carried out for every frame based on the image data that has been acquired at this time (refer, for example, to time t10-t18 in FIG. 3). In this way it becomes to carry out display of an image that is in an in-focus state.

Also, with the one embodiment of the present invention, there is a tracking circuit for carrying out a tracking operation based on image data generated from an image signal of the image sensor (refer, for example, to the tracking section 204b in FIG. 1). There is also a controller that generates image data based on an image signal that has been acquired during a focus adjustment operation, where a focus adjustment operation is executed continuously using a focus controller, and executes a tracking operation using the tracking circuit (refer, for example, to the body controller 204). This controller causes execution of a tracking operation by the tracking circuit using image data corresponding to an image signal in which the evaluation value becomes a peak by the focus controller, from among image data that has been acquired during the focus adjustment operation. In this way, even if the subject moves, when calculating a predicted in-focus position it is possible to increase precision. Also, since tracking is carried out using image data in which an evaluation value becomes a peak, that is, using image data that is focused and not image data that is significantly blurred, it is possible to improve tracking performance.

It should be noted that with the one embodiment of the present invention, the focus controller 204a and the tracking section 204b are formed integrally with the body controller 204, but they may also be formed separately from the body controller 204. Also, the focus controller 204a and the tracking section 204b may have a hardware structure such as gate circuits generated based on a programming language that is described using Verilog, and may also use a hardware structure that utilizes software, such as a DSP (digital signal processor). Suitable combinations of these approaches may also be used.

Also, an example has been described where some parts of the overall processing are processed as software by the body CPU within the body controller 204, and other parts of the overall processing are processed in hardware, but this is not limiting, and it is possible to have all of the processing formed by carrying out software processing or hardware processing.

Also, with the one embodiment of the present invention, an imaging device has been described using a digital camera, but as a camera it is also possible to use a digital single lens reflex camera, a digital single lens camera or a compact digital camera, or a camera for movie use such as a video camera, and further to have a camera that is incorporated into a mobile phone, a smart phone, a mobile information terminal, personal computer (PC), tablet type computer, game console etc. In any event, it is possible to apply the present invention to any device as long as it is for taking pictures and capable of setting a C-AF mode or a continuous shooting mode, or an application for the same.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus that carries out a focus adjustment operation by moving a focus lens based on an image signal of an image sensor for forming a subject image, comprising:
    a focus controller that generates an evaluation value by extracting given signal components from the image signal, and carries out focus adjustment by calculating position of the focus lens where the evaluation value becomes a peak;
    a display that displays an image based on image data generated from the image signal of the image sensor; and
    a controller that executes to display an image using the display by generating image data based on an image signal that has been acquired during a focus adjustment operation where continuous focus adjustment is executed by the focus controller, wherein
    the controller, as initial image display after commencement of the continuous focus adjustment operation, executes display using the display based on image data acquired when a movement position of the focus lens is within a predetermined vicinity of a predicted in-focus position that is based on a history of at least one past in-focus position of the focus lens when an in-focus position was reached in the past, from among image data that has been acquired during the focus adjustment operation, and
    from commencement of the continuous focus adjustment operation until the movement position of the focus lens is within the predetermined vicinity of the predicted in-focus position, an image based on image data generated from the image signal is not displayed on the display section.

2. The imaging apparatus of claim 1, wherein:
the controller does not execute display for a given period after having executed the initial display using the display.

3. The imaging apparatus of claim 1, wherein:
the controller further displays an image of a single color on the display, without displaying an image based on image data generated from the image signal on the display.

4. The imaging apparatus of claim 1, wherein the focus controller performs focus adjustment during burst shooting by the imaging apparatus, and wherein the controller controls the display during the burst shooting by the imaging apparatus.

5. The imaging apparatus of claim 4 wherein the burst shooting by the imaging apparatus is performed with release priority set.

6. The imaging apparatus of claim 4 wherein the burst shooting by the imaging apparatus is performed with release priority unset and wherein the controller further executes a subsequent display using the display based on image data acquired after the initial image display.

7. An imaging method that carries out focus adjustment by moving a focus lens based on image signals of an image sensor for forming a subject image, comprising:
    generating an evaluation value by extracting given signal components from the image signal, and carrying out focus adjustment by calculating position of the focus lens where the evaluation value becomes a peak; and
    displaying an image using a display by generating image data based on an image signal that has been acquired during a focus adjustment operation where continuous focus adjustment is executed, wherein
    when displaying the image on the display, as initial image display after commencement of the continuous focus adjustment operation, display is executed using the display based on image data acquired when a movement position of the focus lens is within a predetermined vicinity of a predicted in-focus position that is based on a history of at least one past in-focus position of the focus lens when an in-focus position was reached in the past, from among image data that has been acquired during the focus adjustment operation, and
    from commencement of the continuous focus adjustment operation until the movement position of the focus lens is within the predetermined vicinity of the predicted in-focus position, an image based on image data generated from the image signal is not displayed on the display section.

8. An imaging apparatus that carries out a focus adjustment operation by moving a focus lens based on an image signal of an image sensor for forming a subject image, and performs actual exposure if an in-focus position is reached, comprising:
    a focus controller that generates an evaluation value by extracting given signal components from the image signal, and carries out focus adjustment by calculating position of the focus lens where the evaluation value becomes a peak;
    a display that displays an image based on image data generated from the image signal of the image sensor; and
    a controller that executes to display an image using the display by generating image data based on an image signal that has been acquired during a focus adjustment operation where continuous focus adjustment is executed by the focus controller, wherein
    the controller, as initial image display after commencement of the continuous focus adjustment operation but before performing actual exposure, executes display using the display based on image data acquired when a movement position of the focus lens is within a predetermined vicinity of a predicted in-focus position that is based on a history of at least one past in-focus position of the focus lens when an in-focus position was reached in the past, from among image data that has been acquired during the focus adjustment operation, and
    from commencement of the continuous focus adjustment operation until the movement position of the focus lens is within the predetermined vicinity of the predicted in-focus position, an image based on image data generated from the image signal is not displayed on the display section.

* * * * *